Nov. 15, 1955    B. R. TEGGE    2,724,007
PARA XYLENE SEPARATION PROCESS
Filed July 30, 1952    2 Sheets-Sheet 1

Bruce R. Tegge    Inventor
By Henry Berk  Attorney

Nov. 15, 1955  B. R. TEGGE  2,724,007
PARA XYLENE SEPARATION PROCESS
Filed July 30, 1952  2 Sheets-Sheet 2

Bruce R. Tegge Inventor
By Henry Berk Attorney

United States Patent Office 2,724,007
Patented Nov. 15, 1955

2,724,007

PARA XYLENE SEPARATION PROCESS

Bruce R. Tegge, Chatham, N. J., assignor to Esso Research and Engineering Company, a corporation of Delaware Application July 30, 1952, Serial No. 301,681

5 Claims. (Cl. 260—674)

This invention relates to the separation of para xylene from hydrocarbon mixtures containing para xylene and its isomers.

This application is a continuation-in-part of Serial No. 96,058, filed May 28, 1949, now Patent No. 2,672,487.

Xylenes are obtained commercially from various natural sources, such as coke oven distillates, as well as from other sources, such as hydrocarbon-cracking and hydroforming operations. A xylene fraction thus obtained ordinarily contains all three xylenes, as well as ethyl benzene. A reasonably effective separation of ortho xylene from this mixture might be made by fractionation of the xylene mixture. Meta and para xylenes, however, are so close in boiling points that fractionation is ineffective to bring about separation. Low temperature separation by crystallization of para xylene is complicated by the formation of eutectic mixtures which result in mixed product and consequent low yields of the purer products.

Thus U. S. Patent No. 1,940,065 teaches that prior to the crystallization of the para xylene, from a feed containing a number of $C_8$ isomers, it is necessary to first distill off and remove aliphatic hydrocarbons, ethyl benzene and ortho xylene. The para xylene is then crystallized from a mixture consisting essentially of only para xylene and meta xylene.

This invention comprises an improved low temperature process for the separation of pure para xylene from a hydrocarbon mixture containing at least one of its isomers and usually more than one, without the necessity for first removing any of the hydrocarbons. According to the method of this invention, the para xylene is crystallized from its mother liquor at a temperature at or slightly above the eutectic point of the feed, and the para xylene crystals thus obtained are finally washed with an immiscible liquid in order to further purify them.

Figure 1:
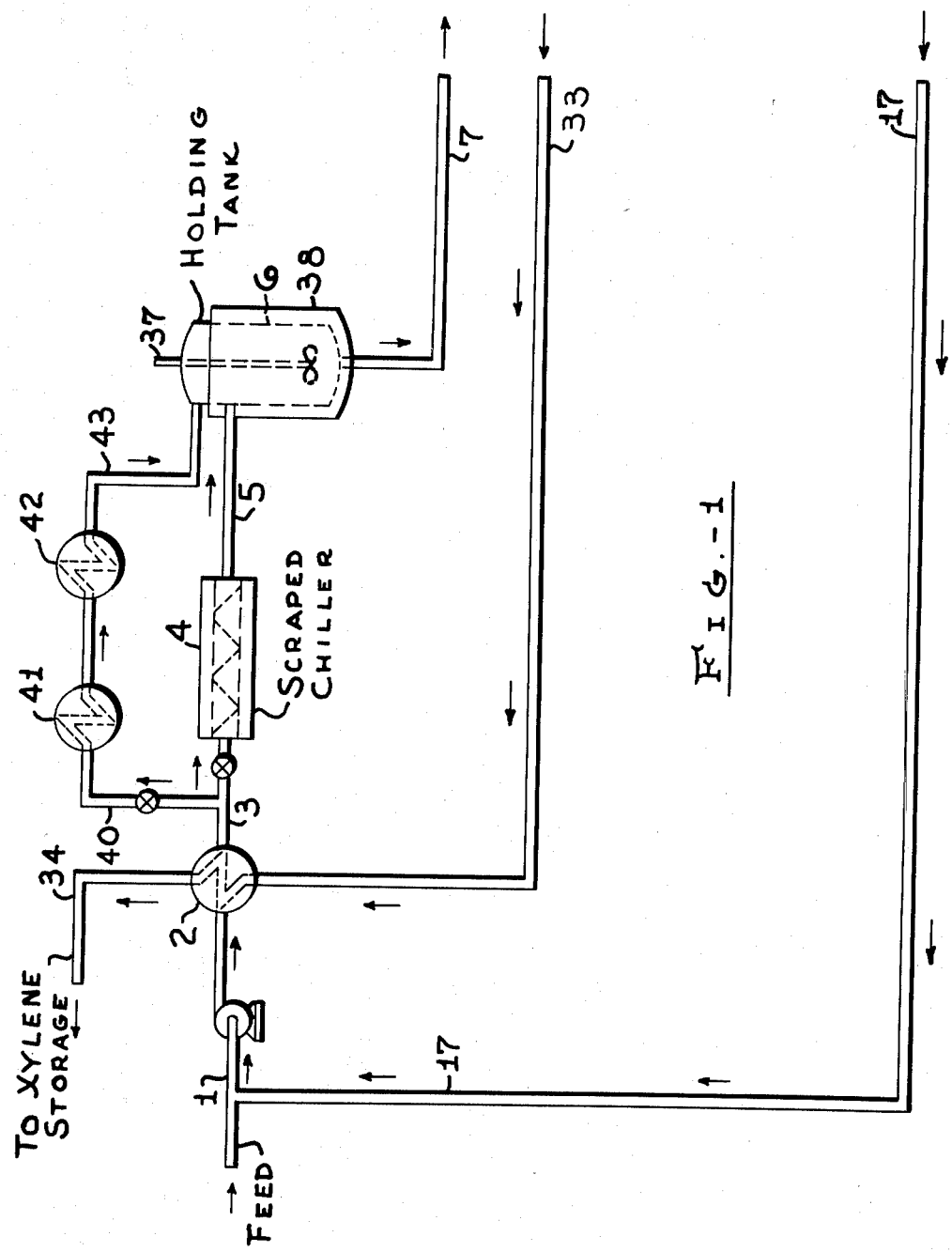
Figure 2:
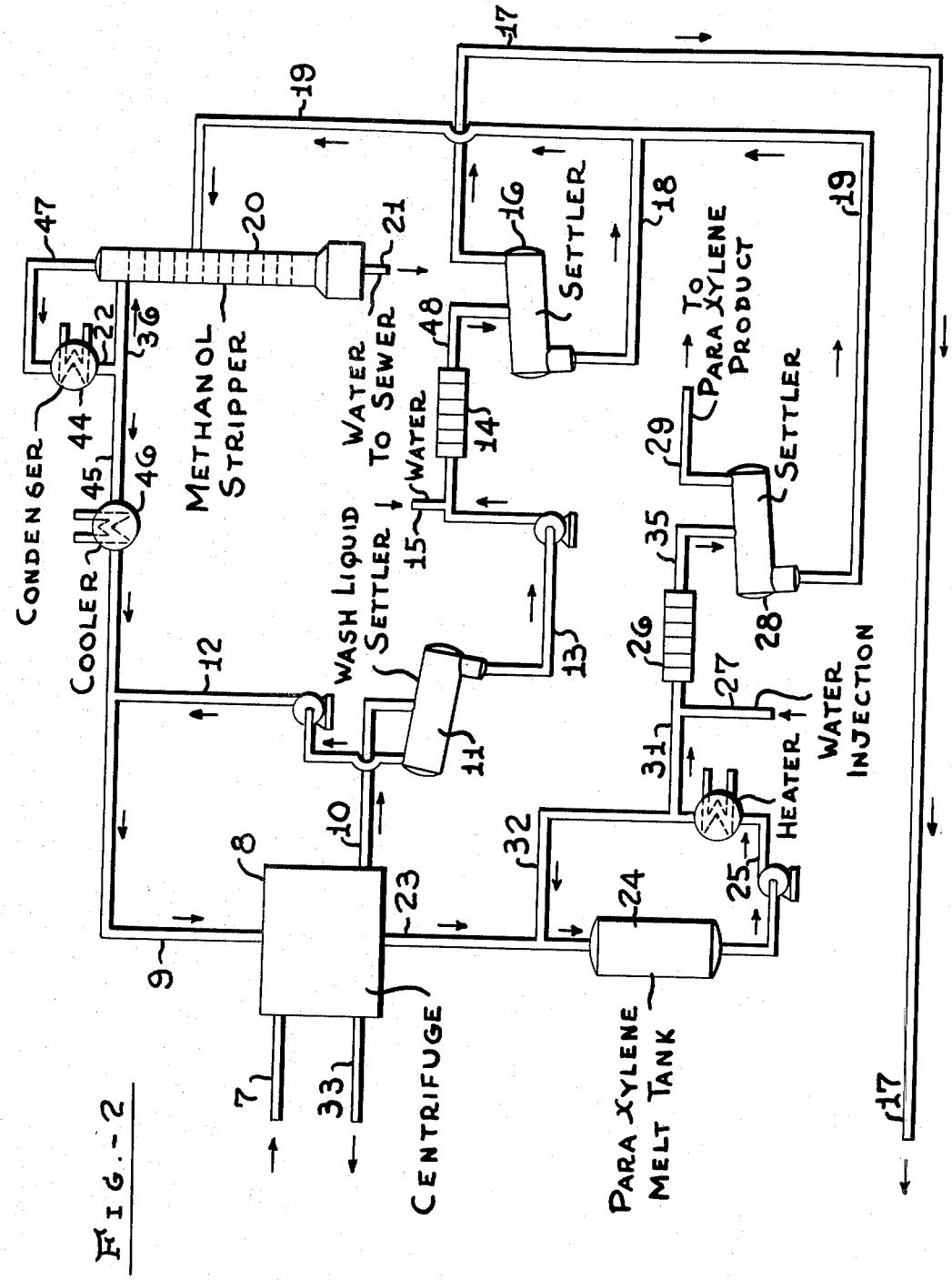

This invention will be better understood by reference to the flow diagram shown in the drawing, Figures 1 and 2. Figure 2 is a continuation of Figure 1 and lines 7, 33 and 17 are shown in both figures.

The feed xylenes typically are a mixture of ortho, meta, and para xylenes and ethyl benzene, such as an aromatic hydrocarbon fraction having a boiling point in the range of 130°–160° C. This feed is fed through line 1 and heat exchanger 2 and then through line 3 into a cylindrical scraped-surface chiller 4 which operates at a low scraping frequency of approximately 5 to 10 scrapes per minute. In the scraped-surface chiller 4, the mixture is cooled to about −65° C., or a crystallization temperature slightly above the eutectic point, so that the para xylene deposits from the mother liquor substantially free of other component crystals. The exact temperature of crystallization is a function not only of the para xylene concentration, but also of the relative proportion of the other isomers present.

The slurry containing the large para xylene crystals suspended in the mother liquor is discharged through line 5 into a holding tank 6 equipped with agitator 37. The holding tank 6 is maintained at approximately the same temperature as the effluent from chiller 4 by refrigerated jacket 38. The slurry remains in the agitated holding tank for a minimum residence time of about 30 minutes for the desired crystal growth. Approximately the maximum amount of para xylene obtainable is obtained within a two-hour residence period.

Alternatively, a major portion of the feed can be rapidly passed directly into holding tank 6 through refrigerated coolers 41 and 42 and through lines 40 and 43, where the liquid is supercooled to approximately the same temperature as in scraped-surface chiller 4. A minor proportion of the feed is concurrently passed through the scraped-surface chiller 4 which is operated in the same manner as discussed above. The crystal nuclei which are formed in the scraped-surface chiller are discharged through line 5 into holding tank 6 and act as centers for deposition of the supercooled para xylene.

The slurry is discharged from holding tank 6 either continuously or in batches through line 7 to a centrifugal separator 8 which may be a batch centrifuge or a battery of batch centrifuges or a continuous perforated centrifuge, a continuous solid bowl centrifugal separator such as the "Bird" centrifugal filter or the "Sharples Super D-Canter" or similar centrifugal equipment.

In a batch centrifuge operation, here described, the mother liquor is removed from the crystals through line 33 and is heat exchanged in heat exchanger 2 with the incoming feed xylenes to enable more economic utilization of refrigeration capacity. The residual mother liquor, which has had a large proportion of para xylene removed, may be used for other operations or added directly to aviation fuel.

Although hydrocarbon miscible solvents are known to have been employed to wash crude para xylene crystals and could be employed on the separated para xylene cake from centrifuging means 8, it is particularly advantageous to employ immiscible wash liquids as described hereafter. This is especially true when large para xylene crystals as taught above are being washed.

The crystals of para xylene in the centrifuge 8, which are in the form of a centrifuge cake, are thus then washed with an aqueous, relatively immiscible wash liquid which is liquid at the temperature in the centrifuge, e. g., at about −65° C. The wash liquid is employed in a ratio of about 10 to 100 parts and preferably 20 to 50 parts of wash liquid per 100 parts of centrifuge cake. The exact limits are a function of the degree of saturation of the wash liquid, temperature and composition of the wash liquid and the product purity desired. Such a wash liquid conveniently is aqueous methanol containing 20% water. This wash liquid, which may be at a temperature of −65° C., enters centrifuge through lines 12 and 9. The immiscible wash liquid is then separated from the para xylene cake by centrifugal action.

Due to the immiscibility of para xylene in the wash liquid, any liquid impurities held on the crystal surfaces are displaced and washed away. Because of the higher temperature of the wash liquid, any eutectic composition which may have inadvertently deposited with the pure para xylene, is melted and washed away. The melted hydrocarbons are returned to feed so no losses in yield are thereby incurred. The wash liquid containing hydrocarbon impurities and any para xylene is passed through line 10 to a settler 11. In the settler, two phases are formed: in this case a lower phase consisting of hydrocarbons and an upper wash liquid phase. The wash liquid is recycled through lines 12 and 9 and reused for washing in centrifuge 8.

The hydrocarbon phase is withdrawn through line 13 into an orifice mixer 14 with warm water injection from line 15. From the orifice mixer 14, the mixture of water, hydrocarbon and methanol is passed through line 48 to a settler 16 where the hydrocarbon phase is removed through line 17 and recycled to feed. The aqueous phase containing some methanol is sent through lines 18 and 19 to a methanol stripping tower 20 where water is rejected through line 21. Methanol is recycled through line 47, condenser 44, lines 22 and 45, cooler 46 and line 9 as makeup for the wash liquid. The composition of the water-methanol wash liquid is controlled by the amount of methanol reflux in line 36.

The para xylene cake in centrifuge 8 is dumped through line 23 into a melt tank 24, where it is heated to above its melting point of 13.3° C. This liquid para xylene, withdrawn through lines 25 and 31, is scrubbed with warm liquid water from line 27 in an orifice mixer 26. Warm liquid para xylene is returned through line 32 to melt tank 24 in order to melt additional solid para xylene. A mixture of para xylene, water, and alcohol is withdrawn from mixer 26 through line 35 to settler 28, from which the pure para xylene phase is removed as product through line 29. The aqueous phase from the settler containing some methanol is sent to the methanol stripper 20 through line 19.

The crystallization of the para xylene from the mother liquor is conducted at or slightly above the eutectic point of the feed in order to prevent deposition of mixed impure product. These eutectic points, i. e., the temperature at which the eutectics begin to crystallize from solution, vary with the composition of the feed material and can be calculated for any compositions of the nature described. Some typical first eutectc points are given in the table below.

Typical feed compositions as well as the eutectic points above which the process is operated are indicated in the table.

Table

| Feed (Wt. Percent) | Para Xylene Crystallization Point, ° C. | First Eutectic Point and Components |
|---|---|---|
| I ---- { 21% para xylene<br>39.5% ortho xylene<br>31.6% meta xylene<br>7.9% ethyl benzene } | −35 | −55° C. (para/ortho). |
| II ---- { 21% ortho xylene<br>48% meta xylene<br>19% para xylene<br>12% ethyl benzene } | −40 | −67° C. (para/meta). |
| III ---- { 60.8% meta xylene<br>24.1% para xylene<br>15.1% ethyl benzene } | −36 | −59° C. (para/meta). |
| IV ---- { 71.6% meta xylene<br>28.4% para xylene } | −28 | −52° C. (para/meta). |
| V ---- { 23.9% ortho xylene<br>54.6% meta xylene<br>21.5% para xylene } | −36 | −63° C. (para/meta/ortho). |

The feed therefore is not cooled to a temperature at which the para xylene first crystallizes until the feed enters scraped-surface chiller 4 or coolers 41 and 42.

While the above-listed feed compositions consist of C8 aromatic isomeric mixtures, suitable feed stocks may also contain small amounts of paraffinic and naphthenic hydrocarbons of the appropriate boiling point range, i. e., 130°–160° C. In general, therefore, the crystallization temperatures employed in the scraped-surface chiller vary in the range of about −40° C. to about −90° C., and most advantageously −60° C. to −70° C. when ethyl benzene is present with the three xylene isomers.

Preferred sources of the feed mixtures for the crystallization are highly aromatic distillate fractions obtained from aromatic solvent extracts of catalytically cracked, hydroformed or thermally cracked petroleum oils. These feed mixtures yield close to 10 weight per cent or more of pure xylene when the feed cut is properly made and the separation process is properly controlled.

The preferred immiscible wash liquids are water-methanol compositions which may vary in the range of 5 to 50 parts of water and from 50 to 95 parts of methanol. The use of 100% water compositions as the wash liquid would result in the crystallization of the latter at the low washing temperatures employed.

Water-methanol solutions containing up to about 20% water have lower specific gravities than C8 aromatics, even at room temperatures, and thus appear as the upper phase in settler 11. On the other hand, when the immiscible methanol wash liquids contain 25% of water, the wash liquids have higher specific gravities than the hydrocarbon phase in settler 11 at room temperatures (but become lighter than the latter as the temperature diminishes to −60° C.). It is desirable to have the hydrocarbon phase as the lower phase in settler 11 to prevent phase inversion due to changes in temperature during the operation. This can be accomplished by using a composition containing at least 80% methanol. A 20% water–80% methanol solution is therefore particularly adapted for use.

Other suitable relatively immiscible wash liquid compositions consist of mixtures of water and other polar oxygenated organic compounds such as lower molecular weight, preferably water soluble, alcohols, glycols, ketones, dioxanes, etc. In choosing an aqueous immiscible wash liquid containing a polar oxygenated compound other than methanol, the exact composition will be dependent upon the crystallization point of the wash liquid. It will also be dependent upon the desired differences in density between the hydrocarbon phase and the wash liquid phase in settler 11 at the temperatures of operation.

The immiscible wash liquids have three distinct effects on the para xylene cake:

1. Displacement of the liquid impurities held on the surface of the para xylene cake;
2. Solution of para xylene impurities by the organic constituents of the wash liquid;
3. Melting of low melting para xylene impurities by the sensible heat of the immiscible wash liquid.

Only the first two of these three factors are operative when the wash liquid is introduced on the para xylene cake at a temperature at or below the temperature of the latter. The third factor becomes operative when the wash liquid is introduced at a temperature above the temperature of the para xylene cake. The upper temperature limit of the wash liquid is therefore dependent upon heating economics and the amount of para xylene it is desired to melt in the para xylene cake.

The characteristics necessary for the lower molecular weight polar organic oxygenated compounds to be used with water in this operation as wash liquids are:

1. Relative immiscibility with the C8 aromatic hydrocarbons, i. e., so that two liquid phases are formed, at the temperatures of operation;
2. Low viscosity at the temperatures of operation;
3. A crystal point below the temperatures of operation;
4. Complete miscibility with water at temperatures at which the wash liquids are employed.

It should be understood that whenever the term "immiscible wash liquids" is used, it refers to compositions of water and the indicated type of lower molecular weight polar organic oxygenated compounds which possess the characteristics described above.

There are several advantages accruing from the use of the immiscible wash liquids. Thus, prior art single stage crystallization processes required whirling of the para xylene centrifuge cake for periods of over two hours in order to obtain para xylenes of 95% purity. The use of an immiscible wash liquid as taught in this invention permits the reduction of the washing time to the order of ½ to 10 minutes with increased product purities. The reduced frequency of scraping operation and crystal growth in the slurry holding tank also contribute to the reduction of the necessary washing time.

When a miscible wash liquid, such as isopentane, petroleum ether, toluene, or the like, is employed as taught in the prior art, it becomes necessary to provide distillation facilities for the xylene filtrate, the para xylene, and the wash liquid. The size of the xylene filtrate necessitates an extremely large distillation or stripping tower. It is necessary, in addition, to strip the miscible wash liquid from the para xylene product in order to obtain adequate para xylene purity. It is then also necessary to strip the wash liquid filtrate in order to separate the wash liquid from the dissolved aromatic hydrocarbons. Operation of all these distillation facilities is uneconomical as compared to the process of this invention.

The use of the immiscible wash liquids of this invention permits the gravitational separation of impurities from the wash liquids. It also permits the settling of any wash liquid entrained in the xylene filtrate or in the para xylene product. Where a wash liquid containing two components, such as methanol and water, one of which is soluble in the xylene phase, is used, the partition coefficient is such that the methanol is readily removed from the para xylene by water scrubbing. This is much more economical than distillation operations. In the process of this invention, only one stripping tower is employed to obtain methanol for recycling to the wash liquid. In a small plant, even this tower could be eliminated and makeup methanol provided from an external source.

Analysis of the para xylene phase, from the para xylene melt tank 24, which had been washed with an equal volume of 75% methanol-25% water mixture, thus showed a content of only 0.2% weight of water and 1.8% weight of methanol. The methanol is then removed by a liquid-liquid scrubbing operation with water as shown in orifice mixer 26 and the residual methanol content in the para xylene is still no higher than commercially acceptable.

It is to be understood that the invention is not limited to the specific embodiments which have been offered merely as illustrations. The para xylene crystals may thus be separated from residual mother liquid by other equipment than centrifuging, such as rotary filters, filter presses, vacuum or press filters, etc. Other modifications, such as auxiliary refrigeration facilities, scrubbing facilities, etc., may be made without departing from the spirit of the invention.

What is claimed is:

1. In a process for separating para xylene from a normally liquid predominantly aromatic hydrocarbon feed boiling in the range of 130° to 160° C. wherein the aromatic feed is chilled to a crystallization temperature between about −40° to −90° C. to crystallize substantially only the para xylene and the resulting para xylene crystals are mechanically separated from chilled mother liquor, the improvement which comprises placing the separated para xylene crystals substantially at said crystallization temperature in a crystal washing zone, washing said crystals in said washing zone with about 10 to 100 parts (per 100 parts of para xylene crystals) of an aqueous solution of a lower molecular weight polar organic oxygenated compound which solution is at a temperature low enough to be immiscible with the hydrocarbons to be washed out and has a density different from said hydrocarbons, removing a mixture of aqueous wash liquid and liquid hydrocarbons from said crystal washing zone, recovering the washed para xylene crystals, gravitationally separating the aqueous wash liquid from the liquid hydrocarbons admixed therewith, and recycling the separated wash liquid to the crystal washing zone.

2. A process according to claim 1 wherein the aqueous wash solution has a lighter specific gravity than said liquid hydrocarbons both at the crystal washing temperature and at room temperature.

3. In a process for separating para xylene from a normally liquid predominantly aromatic hydrocarbon feed boiling in the range of 130° to 160° C. and containing at least 10% of para xylene admixed with a major proportion of other xylene isomers, wherein the feed is chilled to a crystallization temperature between about −60° and −70° C. to crystallize substantially only the para xylene and the resulting chilled slurry is centrifuged in a centrifuging zone to separate the resulting para xylene crystals from residual mother liquor, the improvement which comprises placing the separated para xylene crystals substantially at said crystallization temperature in a crystal washing zone, washing said crystals in said crystal washing zone with about 20 to 50 parts (per 100 parts of crystals) of an aqueous wash liquid which contains about 80 to 95% methanol and 20 to 5% water and is at a temperature above that of the para xylene crystals but low enough to be immiscible with the hydrocarbons to be washed away, whereby low melting impurities are melted and liquid hydrocarbons are washed away, removing hydrocarbon-containing wash liquid from the crystal washing zone, gravitationally separating said removed wash liquid into an aqueous fraction and an impure liquid aromatic hydrocarbon fraction, recycling the separated wash liquid to the crystal washing zone, separately removing the washed para xylene crystals from the crystal washing zone, melting the removed para xylene crystals, scrubbing the resulting melted para xylene with wash water to separate dissolved methanol therefrom, and separating purified liquid para xylene from the wash water.

4. In a process according to claim 3, the further improvement of scrubbing said separated impure aromatic hydrocarbon fraction with water, reseparating the resulting mixture into a scrubbed aromatic hydrocarbon layer and a methanol-containing water layer, recycling the scrubbed hydrocarbon layer for blending with fresh feed, distilling the methanol-containing water layer to provide a distillate containing at least 80% methanol and recycling the distillate to the crystal washing zone.

5. A process according to claim 4 wherein the methanol-containing wash water used in scrubbing the melted para xylene is combined with the methanol-containing wash water used in scrubbing said impure aromatic hydrocarbon fraction and the combined wash water is distilled to recover methanol therefrom.

References Cited in the file of this patent

UNITED STATES PATENTS

| 2,541,682 | Arnold | Feb. 13, 1951 |
| 2,615,058 | Swietoslawski | Oct. 21, 1952 |

OTHER REFERENCES

Norris: Experimental Organic Chemistry, Sec. Ed. (1924), pages 7 and 8. McGraw-Hill Publishers, 330 W. 42nd St., N. Y. 36, N. Y.